United States Patent [19]

West

[11] Patent Number: 4,812,517

[45] Date of Patent: Mar. 14, 1989

[54] DISPERSANTS RESISTANT TO COLOR CHANGE

[75] Inventor: Michael W. J. West, Wilmington, Del.

[73] Assignee: E. I. Du Pont de Nemours and Company, Wilmington, Del.

[21] Appl. No.: 138,039

[22] Filed: Dec. 28, 1987

[51] Int. Cl.$^4$ .................... C08F 8/00; C08F 293/00
[52] U.S. Cl. ......................... 525/94; 524/548; 524/560; 525/286; 525/308; 525/309; 525/327.3; 525/330.4; 525/330.5; 525/348; 525/349; 525/351; 525/375; 525/374; 525/386
[58] Field of Search .............. 525/280, 291, 296, 348, 525/349, 351, 286, 301, 94, 308

[56] References Cited

U.S. PATENT DOCUMENTS 4,654,387  3/1987  Buysch et al. ................ 525/296
4,656,226  4/1987  Hutchins et al. .............. 525/93

FOREIGN PATENT DOCUMENTS 1108261  4/1968  United Kingdom ............ 27/12

Primary Examiner—Wilbert J. Briggs, Sr.

[57] ABSTRACT

Acrylic AB block copolymers that are useful as pigment dispersants and which are resistant to yellowing and other color changes, characterized by aromatic substituents bonded to the A segment of the block copolymer.

11 Claims, No Drawings

DISPERSANTS RESISTANT TO COLOR CHANGE

BACKGROUND OF THE INVENTION

Previously, AB block copolymers have been developed which show good action as dispersants, which use aromatic carboxylic acids incorporated in the A segment to provide binding to a pigment surface. Such copolymers are described, for example, in Hutchins et al., U.S. Pat. No. 4,656,226, issued Apr. 7, 1987. Hutchins et al. note that many carboxylic acids, when incorporated onto the A segment of the block copolymer, can provide improved dispersant characteristics. Preferred acids which can be so used include benzoic acid, 2-,3-,4-nitrobenzoic acid, 3,5-dinitrobenzoic acid, 1-naphthoic acid, and 3-chlorobenzoic acid.

While the Hutchins et al. compositions provide excellent dispersant characteristics, many of these compounds exhibit color changes upon extended exposure to light and aging. Because dispersants are often used in mixtures designed to produce a specific color, changes in the color cover time are undesirable.

SUMMARY OF THE INVENTION

The present invention is based on the discovery of a specific class of phenyl aromatic AB block copolymers which exhibit excellent performance as dispersants and which resist color changes due to exposure to light or aging.

Specifically, the instant invention provides a block copolymer having at least one A segment and at least one B segment, each segment having a molecular weight of at least about 500 and the backbones of which consist essentially of at least one polymerized methacrylate or acrylate ester, at least about 20% of the acrylic moieties of the A segment having bonded thereto a moiety derived from an acid, amide or sulfonamide which is a substituent of a phenyl aromatic; the phenyl aromatic having another substituent which is a conjugating group; the phenyl aromatic having no nitrogen, thiol, or OH group directly bonded to an aromatic ring, and wherein the B segment contains less than about 20% of the acid, amide or sulfonamide moieties present in the A segment.

Preferably, the block copolymer is made by Group Transfer Polymerization techniques (GTP). A preferred monomer for the A segment is 2,3-epoxypropyl methacrylate which is later reacted using a basic catalyst with the phenyl aromatic.

DETAILED DESCRIPTION OF THE INVENTION

The instant invention is based on the discovery that, in block copolymers of the general type described in Hutchins et al., U.S. Pat. No. 4,656,226, the presence of certain aromatic substituents on the A segment will provide excellent performance of the block coolymers as dispersants, and, at the same time, do not exhibit yellowing or other color change when exposed to light and aging. Accordingly, the present compounds are exceptionally well suited for use as dispersants for pigments and in other applications where color change would not be desirable.

The block copolymers of the present invention have at least one A segment and at least one B segment. While the block size is not critical to the present invention, each segment generally has a molecular weight of at least about 500. The backbones of the segments consist essentially of at least one polymerized methacrylate or acrylate ester. In the context of the present invention, both methacrylate and acrylate units are designated as acrylic moieties. At least about 20% of the acrylic moieties of the A segment have bonded thereto a fragment derived from an acid, amide, or sulfonamide which is a substituent of a phenyl aromatic. The term fragment is used in the usual sense of meaning that portion of the moiety remaining after bonding to the A segment. Thus, for example, it will be understood that a phenyl aromatic having an acid group would bond to the A segment through that group, after which the acidic hydrogen would no longer be present.

The phenyl aromatic also has another substituent which is a conjugating group. The term conjugating group will be understood to mean one having an atom attached to an aromatic ring and having a double or triple bond. Examples of such conjugating groups include ester, nitrile, aromatic or substituted aromatic, or sulfonamide groups.

Another important characteristics of the phenyl aromatics bonded to the A segments of the present block copolymers is that they have no nitrogen, thiol, or OH group directly bonded to an aromatic ring, regardless of whether the aromatic ring is the primary component of the phenyl aromatic or a substituent.

Specific examples of such ester or amides include 4-sulfamido benzoic acid, n-phthaloylglycine, saccharin, and 4-biphenyl carboxylic acid.

4-sulfamido benzoic acid has the structural formula

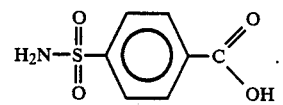

As can be seen from the formula, this compound, as required by the present invention, is a phenyl aromatic, has both a carboxylic acid group and a sulfonamide group, and has no nitrogen, thiol, or hydroxy groups directly bonded to the aromatic ring.

4-biphenyl carboxylic acid has the structural formula

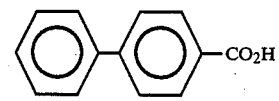

This compound, as required by the present invention, is a phenyl aromatic having a carboxylic acid group. As a conjugating group, this compound has an aromatic substituent, a second aromatic ring. In addition, there are no nitrogen, sulfur, or hydroxy groups directly bonded to the aromatic ring.

Similarly, it can be seen that n-phthaloylglycine,

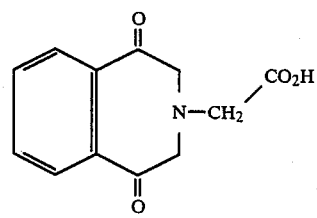

and saccharin

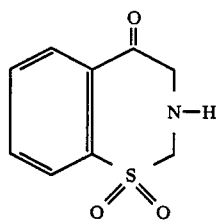

satisfy the structural requirements of the present claims.

The B segment of the present copolymers contains less than about 20% of the acid, amide, or sulfonamide moieties present in the A segment, and preferably none of these moieties. The B segment is preferably prepared from an alkyl methacrylate or blend of alkyl methacrylates such as methyl methacrylate (MMA), MMA and butyl methacrylate (BMA), BMA alone, or 2-ethylhexyl methacrylate (2-EHMA).

The block copolymers of the present invention can be prepared using the general techniques described in Hutchins et al., U.S. Pat. No. 4,656,226, hereby incorporated by reference. Using the techniques described therein, it has been found to be convenient to form the basic AB block copolymer, and then attach the required phenyl aromatic derivative by bringing the amide or ester into contact with the basic block coplymer under reaction conditions, reacting the ester or amide with the epoxy group in the block copolymer structure. In the alternative, monomers compatible with a block copylmerization process, such as GTP, which introduce appropriate pendant groups can be used directly. One such monomer, for example, is 2-(4-phenylbenzoyloxy) ethyl methacrylate.

The compounds of the present invention, by reason of the different polar characteristics of the A and B segments, demonstrate outstanding performance as pigment dispersants. The presence of two conjugating groups confers excellent dispersion properties, particularly for pigments which are difficult to disperse. Moreover, these compositions are remarkably resistant to color change on aging or exposure to light. While this advantage is not fully understood, it is believed to be a result of the polar groups having no nitrogen, thiol or hydroxy groups directly attached to an aromatic ring. It is believed that these groups allow formation of highly conjugated or quinone type structures upon exposure to light or aging. In addition, the present compositions avoid the more complex napthyl structure seen in some of the compounds disclosed by Hutchins et al. In addition to their complexity, these naphthyl material do not appear to be uniformly resistant to color changes upon exposure to light and aging.

In the following Examples and Comparative Examples, the dispersants were evaluated according to established techniques for dispersing performance and yellowing. The Dispersion Rating refers to the sum of 4 ratings in MIBK, as explained in the Hutchins et al. patent at Column 6, line 67 to Column 7, line 18. According to that evaluation procedure, 4 represents a perfect dispersant, while 16 indicates poor dispersant performance.

The increase in yellowness was evaluated by exposure to light and aging on a QUV instrument, followed by color measurement on the LAB scale. According to this test, the resulting number represents the change in yellowness of a white paint. The least change is therefore the most desirable. According to this test, for example, 1 or greater is unacceptable.

In the Examples and Control Examples, all monomers and solvents were purified of residual alcohols and water by distillation, use of 4 Angstrom molecular sieves, or by passing through a column of activity 1 alumina, as appropriate, and were stored under nitrogen.

In the following Examples 1–4 and Comparative Examples B–D, the basic AB block copolymer, to which was added the various substituent groups, was prepared according to the following procedure.

A 5-liter flask was purged with nitrogen and charged with 1580 g of 60/40 w/w propylene carbonate/tetrahydrofuran, 403.6 g glycidyl methacrylate, 41.3 g 1-methoxy-1-trimethylsiloxy-2-methylpropene (hereinafter termed "initiator"), 4.2 g xylenes, and 0.4 g toluene. The glycidyl methacrylate was the primary component of the A block. After cooling to 5° C., reaction was initiated by the addition of 10.4 mL 0.34M tetrabutylammonium-3-chlorobenzoate in tetrahydrofuran (hereafter termed "catalyst"). The temperature rose, without cooling, to 45.8° C. in 23 minutes. A feed of 1145 g of 41.3/58.7 w/w methyl methacrylate/butyl methacrylate over 30 minutes was begun 28 minutes after first addition of catalyst. The methyl methacrylate/butyl methacrylate monomers were the primary components of the B block of the copolymer. Beginning at the same time, 5.22 mL of catalyst was added over 30 minutes. At the end of the same time, 5.22 mL of catalyst was added over 30 minutes. At the end of the monomer feed, the reaction temperature was ca. 65° C. After a further 7 minutes, the temperature had risen to 85° C.; an ice bath was used for 45 minutes to lower the temperature. After the ice bath was removed, 7.6 g of methanol was added. Actual solids of the resin was measured as 48.77 wt %, theoretical solids was 49.15% (obtained 99.2% of theory). The actual epoxy content of the resin was 0.869 meq epoxy per gram of resin. The theoretical content was 0.888 meq/gram resin (obtained 97.9% of theory).

This compound was designated as Block Precursor 1.

In Control Example A, Block Precursor 2 was used. This Block Precursor is prepared by the same general procedures as Block Precursor 1. However, it was prepared in dimethoxyethane, at 55% solids, as a block copolymer of methyl methacrylate and glycidyl methacrylate with nominal degrees of polymerization of 40//8. The epoxy number of the resin was 0.7 meq/gram. Block Precursor 2 was also used in Control Examples E, F, G, and H.

EXAMPLE 1

Esterification with 4-sulfamidobenzoic acid

Block Precursor 1 (102.7 g) was combined with 17.1 g 4-sulfamidobenzoic acid and 1.1 mL 40 wt % benzyl trimethylammonium hydroxide in methanol; the mixture was brought to 95° C. (start of reflux) and a 5 mL sample was removed. The translucent white mixture was refluxed for about 45 minutes before the taking of a 5 mL sample and the addition of 35.7 g tetrahydrofuran. Samples of 5 mL were taken each hour for two hours, and 30 minutes later. After 2 further hours a fifth sample was removed, and after a final ½ hour at reflux, the reaction was judged sufficiently complete. The priduct was a translucent white resin, 48% solids. The epoxy values of the samples were as follows:

| Sample | Epoxy value (meq epoxy/gram resin) |
|---|---|
| 1 | 0.705 |
| 2 | 0.332 |
| 3 | 0.295 |
| 4 | 0.242 |
| 5 | 0.173 |
| Final | 0.141 |

| Dispersion Rating in methyl isobutylketone | |
|---|---|
| W853 | 1 |
| W805 | 1 |
| W811 | 1 |
| W573 | 1 |

After 29 days of QUV exposure, the b (yellowness) measurement increased by only 0.36 units.

EXAMPLE 2

Esterification with N-phthaloylglycine

Block Presursor 1 (101.8 g) was combined with 17.2 g N-phthaloyl glycine and 1.1 mL 40 wt % benzyl trimethylammonium hydroxide in methanol. When the mixture came to reflux, a 5 mL sample was taken. Samples of 5 mL were taken at 30 minutes intervals for two samples, after which 7.5 and 10.2 g THF were added. An hour later, another 5 mL sample was taken, and after a further 2 hours another sample was taken. After 0.5 further hours the reaction was sufficiently complete. The product was a thick, translucent resin, 50.4% solids after thinning with 5.1 g THF. The epoxy values of the samples were as follows:

| Sample | Epoxy value (meq epoxy/gram resin) |
|---|---|
| 1 | 0.622 |
| 2 | 0.340 |
| 3 | 0.279 |
| 4 | 0.185 |
| 5 | 0.132 |
| Final | 0.099 |

| Dispersion Rating in methyl isobutylketone | |
|---|---|
| W853 | 1 |
| W805 | 1 |
| W811 | 1 |
| W573 | 1 |

After 29 days of QUV exposure, the b (yellowness) measurement increased by only 0.37 units.

EXAMPLE 3

Esterification with saccharin

Block Precursor 1 (282.3 g) was combined with 42.6 g of saccharin, or o-benzoic sulfimide, 53 g diacetone alcohol, and 2.33 g 40 wt % benzyl trimethylammonium hydroxide in methanol. When the mixture was at reflux 45 minutes, a sample was taken (epoxy content 0.354 meq/gram). Solvent was removed by distillation to bring the reflux temperature to 125° C., then after a total of 1.5 hrs at reflux, THF (20 mL) was added, and a final sample was analyzed for epoxy content (0.02 meq/gram).

| Dispersion Rating in methyl isobutylketone | |
|---|---|
| W853 | 2 |
| W805 | 1 |
| W811 | 3 |
| W573 | 1 |

After 29 days of QUV exposure, the b (yellowness) measurement increased by only 0.5 units.

EXAMPLE 4

Esterification with 4-biphenylcarboxylic acid

Block Precursor 1 (105.1 g) was combined with 17.2 g 4-biphenylcarboxylic acid, and 1.1 ml 40 wt % benzyl trimethylammonium hydroxide in methanol, using the same general reaction techniques as in Control Example A.

| Dispersion Rating in methyl isobutylketone | |
|---|---|
| W853 | 2 |
| W805 | 1 |
| W811 | 3 |
| W573 | 1 |

After 22 days of QUV exposure, the b (yellowness) measurement decreased by 0.14 units.

CONTROL EXAMPLE A

Esterification with 4-nitrobenzoic acid

Block Precursor 2 (150.3 g) was combined with 17.5 g 4-nitrobenzoic acid, and 250. g of a 60:40 (w:w) mixture of toluene and methyl isobutyl ketone. The mixture was brought to reflux, and, over an hour, 250 g of distillate was removed, until the distillate temperature was 107° C. The resulting mixture was refluxed 4.5 hours. The final resin had an epoxy content of 0.05 meq/gram of resin.

| Dispersion Rating in methyl isobutylketone | |
|---|---|
| W853 | 3 |
| W805 | 1 |
| W811 | 3 |
| W573 | 3 |

After 3 days of QUV exposure, the b (yellowness) measurement increased by 3.2 units.

CONTROL EXAMPLE B

Esterification with 1-naphthyl acetic acid

Block Precursor 1 (100.7 g) was combined with 14.7 g 1-naphthylacetic acid and 1.1 mL 40 wt % benzyl trimethylammonium hydroxide in methanol. The mixture was brought to 69° C. and a 5 mL sample was removed. The clear yellow mixture was refluxed for about 45 minutes before the taking of a 5 mL sample and the addition of 9.3 g tetrahydrofuran. Samples of 5 mL were taken each hour for two hours, and 30 minutes later, when 9.5 grams tetrahydrofuran was added. After 2 further hours a fifth sample was removed, and after a final ½ hour at reflux, the reaction was sufficiently complete. The product was a clear yellow resin which was diluted with 14.6 g THF to 47.25% solids. The epoxy values of the samples were as follows:

| Sample | Epoxy value (meq epoxy/gram resin) |
|---|---|

-continued

| | |
|---|---|
| 1 | 0.734 |
| 2 | 0.505 |
| 3 | 0.354 |
| 4 | 0.193 |
| 5 | 0.077 |
| Final | 0.074 |

| Dispersion Rating in methyl isobutylketone | |
|---|---|
| W853 | 3 |
| W805 | 1 |
| W811 | 1 |
| W573 | 1 |
| W573 | 1 |

After 22 days of QUV exposure, the b (yellowness) measurement increased by 1.34 units.

CONTROL EXAMPLE C

Esterification with 3-hydroxy-2-naphthoic acid

Block Precursor 1 (104.1 g) was combined with 16.2 g 3-hydroxy-2-naphthoic acid and 1.1 mL 40 wt % benzyl trimethylammonium hydroxide in methanol and 8.5 g THF. The mixture was brought to 78 C. and it was observed that the mixture was transparent but very dark brown. When the mixture came to reflux, a 5 mL sample was taken. Samples of 5 mL were taken at 30 minute intervals for two samples, then an hour later, and 30 minutes later 9.9 grams tetrahydrofuran was added. After 1.5 further hours the reaction was sufficiently complete. The product was a clear, thick, brown resin, 52% solids. The epoxy values of the samples were as follows:

| Sample | Epoxy value (meq epoxy/gram resin) |
|---|---|
| 1 | 0.596 |
| 2 | 0.344 |
| 3 | 0.232 |
| 4 | 0.127 |
| Final | 0.070 |

| Dispersion Rating in methyl isobutylketone | |
|---|---|
| W853 | 1 |
| W805 | 1 |
| W811 | 1 |
| W573 | 1 |

After 4 days of QUV exposure, the b (yellowness) measurement increased by 4.2 units.

CONTROL EXAMPLE D

Esterification with N-(4-carboxyphenyl)phthalimide

Block Precursor 1 (100.9 g) was combined with 21.1 g N-(4-carboxyphenyl)phthalimide and 1.1 mL 40 wt % benzyl trimethylammonium hydroxide in methanol. When the mixture came to reflux, a 5 mL sample was taken. Samples of 5 mL were taken at 30 minute intervals for two samples, after which 7.5 and 10.2 g THF were added. Then, an hour later, another 5 mL samples was taken, and after a further 2 hours another sample was taken. After 0.5 further hours the reaction was sufficiently complete. The product was a thick, translucent resin, 50.4% solids after thinning with 5.1 g THF. The epoxy values of the samples were as follows:

| Sample | Epoxy value (meq epoxy/gram resin) |
|---|---|
| 1 | 0.622 |
| 2 | 0.340 |
| 3 | 0.279 |
| 4 | 0.185 |
| 5 | 0.132 |
| Final | 0.099 |

| Dispersion Rating in methyl isobutylketone | |
|---|---|
| W853 | 1 |
| W805 | 2 |
| W811 | 1 |
| W573 | 1 |

After 29 days of QUV exposure, the b (yellowness) measurement increased by 2.6 units.

The dispersion characteristics and increase in yellowness for the block copolymers of Examples 1-4 and Control Examples A-D are summarized in Table I.

TABLE I

| EXAMPLE | ESTER FROM | DISPERSION RATING | YELLOWNESS INCREASE |
|---|---|---|---|
| 1 | 4-SULFAMIDO BENZOIC | 4 G | 0.36 G |
| 2 | N—PHTHALOYLGLYCINE | 4 G | 0.37 G |
| 3 | SACCHARIN | 7 G | 0.5 G |
| 4 | 4-BIPHENYL CARBOXYLIC | 7 G | 0.14 G |
| A | 4-NITROBENZOIC | 4 G | 3.0 B |
| B | 1-NAPTHYL ACETIC | 6 G | 1.3 B |
| C | 3-HYDROXY-2-NAPTHOIC ACID | 4 G | 4.2 B |
| D | N—4CARBOXY PHENYL-PHTHALIMIDE | 5 G | 2.6 B |

CONTROL EXAMPLE 3

Esterification with 3-chlorobenzoic acid

Block Precursor 2 (149.6 g) was combined with 15.6 g 3-chlorobenzoic acid, and 276.3 g of a 60:40 (w:w) mixture of toluene and methyl isobutyl ketone. The mixture was brought to reflux, and over 1.3 hours, 253.7 g of distillate was removed, until the pot temperature was 118° C. The resulting solution was refluxed overnite (20 hours) further. Final solids was 60.4%, final epoxy number was 0.05 meq/gram.

| Dispersion Rating in methyl isobutylketone | |
|---|---|
| W853 | 4 |
| W805 | 1 |
| W811 | 3 |
| W573 | 3 |

After 29 days of QUV exposure, the b (yellowness) measurement was essentially unchanged (+/−0.05).

CONTROL EXAMPLE F

Esterification with 1-naphthoic acid

Block Precursor 2 (136.3 g) was combined with 18.0 g 1-napthoic acid, and 280.7 g of a 60:40 (w:w) mixture of toluene and methyl isobutyl ketone. The mixture was brought to reflux, and over 1.3 hours, at least 266 g of distillate was removed, until the distillate temperature was 108.2° C. The solids (80.77%) was unusually high, probably due to loss of solvent. More toluene:methyl isobutylketone (82.4 g) was added, and the fluid, homogeneous mixture was refluxed 2.5 hours.

| Dispersion Rating in methyl isobutylketone | |
|---|---|
| W853 | 3 |
| W805 | 1 |
| W811 | 3 |
| W573 | 1 |

After 29 days of QUV exposure, the b (yellowness) measurement increased by only 0.2 units.

CONTROL EXAMPLE G

Esterification with 2-nitrobenzoic acid

Block Precursor 2 (148.3 g) was combined with 17.5 g 2-nitrobenzoic acid, and 280.6 g of a 60:40 (w:w) mixture of toluene and methyl isobutyl ketone. The mixture was brought to reflux, and over an hour, 2-50 g of distillate was removed, until the distillate temperature was 105° C. The resulting mixture was refluxed 2 hours. The final resin had an acid and epoxy content of 0.05 meq/gram of resin, and the resin was 63.6% solids.

| Dispersion Rating in methyl isobutylketone | |
|---|---|
| W853 | 4 |
| W805 | 1 |
| W811 | 3 |
| W573 | 3 |

After 7 days of QUV exposure, the b (yellowness) measurement increased by 2.0 units.

CONTROL EXAMPLE H

Esterification with 3-nitrobenzoic acid

Block Precursor 2 was combined with 17.5 g 4-nitrobenzoic acid, and 250. g of a 60:40 (w:w) mixture of toluene and methyl isobutyl ketone. The mixture was brought to reflux, and over an hour, 250 g of distillate was removed, until the distillate temperature was 107° C. The resulting mixture was refluxed 4.5 hours. The final resin had an epoxy content of 0.051 meq/gram of resin.

| Dispersion Rating in methyl isobutylketone | |
|---|---|
| W853 | 3 |
| W805 | 1 |
| W811 | 3 |
| W573 | 3 |

After 7 days of QUV exposure, the b (yellowness) measurement increased by 2.0 units.

The dispersion characteristics and increase in yellowness for the block copolymers of Control Examples E-H are summarized in Table II.

TABLE II

| EXAMPLE | ESTER FROM | DISPERSION RATING | YELLOWNESS INCREASE |
|---|---|---|---|
| E | 3-CHLORO | 11 B | −0.03 G |

TABLE II-continued

| EXAMPLE | ESTER FROM | DISPERSION RATING | YELLOWNESS INCREASE |
|---|---|---|---|
| F | 1-NAPTHOIC | 8 B/G | 0.2 G |
| G | 2-NITRO | 11 B | 2.0 B |
| H | 3-NITRO | 10 B | 2.0 B |

CONTROL EXAMPLE I

Esterification with 3,4,5-trimethoxybenzoic acid

Block Precursor 2 (149.3 g) was combined with 21.6 g 3,4,5-trimethoxybenzoic acid, and 276.8 g of a 60:40 (w:w) mixture of toluene and methyl isobutyl ketone. The mixture was brought to reflux, and, over 1.3 hours, 253.7 g of distillate was removed, until the boiling temperature was 108.2 C. The resulting solution was further refluxed overnite (14 hours). The final solids was 54.0%, and the final epoxy number was 0.07 meq/gram.

| Dispersion Rating in methyl isobutylketone | |
|---|---|
| W853 | 3 |
| W805 | 1 |
| W811 | 3 |
| W573 | 3 |

CONTROL EXAMPLE J

Esterification with 4-nitrobenzoic acid

For this preparation, Block Precursor 3 was used, which was prepared according to the same general procedures as Block Precursor 1, but which had an epoxy content of 0.993 meq/gram of resin, and solids of 61.5 %, versus a theoretical of 1.07 meq/g and 59.6% solids.

Block Precursor 3 (99.4 g) was heated to 70° C. 4-Nitrobenzoic acid (14.8 g) was added, followed immediately by 4.9 mL 1M tetrabutylammonium3-chlorobenzoate in acetonitrile. The mixture was stirred and refluxed for 3 hours, and diluted with 30 g of toluene, to yield a resin of 48.2% solids, and epoxy content of 0.022 meq/gram.

| Dispersion Rating in methyl isobutylketone | |
|---|---|
| W853 | 1 |
| W805 | 1 |
| W811 | 1 |
| W573 | 1 |

After 14 days of QUV exposure, the b (yellowness) measurement increased by 3.0 units.

CONTROL EXAMPLE K

Esterification with 2,4-dihydroxybenzophenone

Block Precursor 2 (146.7 g) was combined with 20.9 g 2,4-dihydroxybenzophenone, and 279.6 g of a 60:40 (w:w) mixture of toluene and methyl isobutyl ketone. The mixture was brought to reflux, and, over 1.5 hours, at least 254.2 g of distillate was removed, until the distillate temperature was 111.2° C. The mixture was refluxed for 20 hours, to give a final resin of 53.6% solids and epoxy number of 0.05 meq/gram.

| Dispersion Rating in methyl isobutylketone | |
| --- | --- |
| W853 | 3 |
| W805 | 1 |
| W811 | 3 |
| W573 | 3 |

I claim:

1. A block copolymer having at least one A segment and at least one B segment, each segment having a molecular weight of at least about 500 and the backbones of which consist essentially of at least one polymerized methacrylate or acrylate ester, at least 20% of the acrylic moieties of the A segment having bonded thereto a moiety derived from a carboxylic acid, an amide or sulfonamide which is a substituent of a phenyl aromatic; the phenyl aromatic having another substituent which is a conjugating group; the phenyl aromatic having no nitrogen, thiol, or OH group directly bonded to an aromatic ring, and wherein the B segment contains less than 20% of the acid, amide or sulfonamide moieties present in the A segment.

2. A block copolymer of claim 1 wherein the fragment which is a substituent of the phenyl aromatic is selected from carboxylic acid or sulfonamide.

3. A block copolymer of claim 1 wherein the B segment contains substantially no acid, amide or sulfonamide moieties derived from phenyl aromatics.

4. A block copolymer of claim 1 wherein the conjugating group on the phenyl aromatic is selected from ester, nitrile, aromatic substituted aromatic and sulfonamide groups.

5. A block copolymer of claim 1 wherein the moiety bonded to the A segment is derived from 4-sulfamidobenzoic acid.

6. A block copolymer of claim 1 wherein the moiety bonded to the A segment is derived from n-phthaloyl glycine.

7. A block copolymer of claim 1 wherein the moiety bonded to the A segment is derived from saccharine.

8. A block copolymer of claim 1 wherein the moiety bonded to the A segment is derived from 4-biphenylcarboxylic acid.

9. A pigment dispersion in organic solvent dispersed by means of a composition of claim 1.

10. A coating composition comprising a pigment dispersion of claim 9, a film former and a liquid medium.

11. A molding composition comprising a pigment dispersion of claim 9 and a resin.

* * * * *